United States Patent [19]

Riser

[11] 4,317,382

[45] Mar. 2, 1982

[54] DRIVE MECHANISM FOR THE LEAF OR LEAVES OF A SLIDING DOOR OR THE LIKE

[75] Inventor: Rene Riser, Eiken, Switzerland

[73] Assignee: Swiss Aluminium Ltd., Chippis, Switzerland

[21] Appl. No.: 143,603

[22] Filed: Apr. 25, 1980

[30] Foreign Application Priority Data

Apr. 30, 1979 [CH] Switzerland ........................ 4056/79

[51] Int. Cl.³ ............................................... F16H 21/16

[52] U.S. Cl. ........................................... 74/25; 49/360; 74/89

[58] Field of Search ............... 49/360; 74/25, 89, 202, 74/206

[56] References Cited

U.S. PATENT DOCUMENTS

| | | | |
|---|---|---|---|
| 2,204,638 | 6/1940 | Weathers | 74/25 |
| 3,272,021 | 9/1966 | Weber | 74/25 |
| 3,638,504 | 2/1972 | Zaruba | 74/25 |
| 4,191,059 | 3/1980 | Vanslette | 74/25 |

*Primary Examiner*—Kenneth Downey
*Attorney, Agent, or Firm*—Bachman and LaPointe

[57] ABSTRACT

A drive mechanism for the leaf or leaves of a sliding door or the like comprises a rotatable shaft and at least one non-rotatable roller head which can be longitudinally displaced along the shaft when the shaft is rotated. The roller head comprises a plurality of rollers which are inclined to and in contact with the shaft. On rotating the shaft the roller head is displaced along the shaft due to the contact of the inclined rollers on the shaft. The lateral movement of the roller head may be transferred to the leaf of a sliding door or the like.

4 Claims, 4 Drawing Figures

DRIVE MECHANISM FOR THE LEAF OR LEAVES OF A SLIDING DOOR OR THE LIKE

BACKGROUND OF THE INVENTION

The present invention resides in a drive mechanism for moving the leaf or leaves of a sliding door or window or for tilting flaps or the like which comprises a motor having a rotary output which is converted by transmission facilities to lateral movement of at least one member for moving the leaf or leaves.

Known drive mechanisms comprise, for example, a threaded spindle with a nut screwed on to it, as a result of which the rotation is transmitted from the motor to one component while the other part is pushed in an axial direction as a result of the rotation (Swiss Pat. No. 409 690). Another known drive mechanism is such that the rotary action from the motor is transferred by the engagement of a powered cogged wheel with at least one horizontal cogged rod as a result of which the rotational movement is converted to a lateral movement (Swiss Patent 436 077). Also known is a drive mechanism for a sliding door employing a linear electromotor the rod like armature of which acts in the longitudinal direction on one leaf of a door via a pulling mechanism (Swiss Pat. No. 547 423).

It is the principal object of the present invention to develop a drive mechanism which does not require engaging means in a transmission such as cogged wheels, threads and the like but produces lateral movement in a simple manner by using a normal rotary motor drive.

SUMMARY OF THE INVENTION

The foregoing object is achieved by way of the present invention wherein transmission comprises a rotatable shaft and at least one non-rotatable roller head having a set of friction rollers arranged uniformly around the circumference of the shaft, and mounted with respect to the shaft such that their axes of the rollers are inclined to the axis of the shaft. By such an arrangement the roller head can be longitudinally displaced along the shaft due to the contact of the inclined rollers against the periphery of the shaft. The rollers convert the rotational movement at the points of contact on the shaft into a lateral movement along the axis of the shaft.

The present invention causes the rotational action of the driving motor to be converted by the contact of the rollers to a translatory movement. Due to the rotational movement of the shaft and the contact and the inclination of the rollers with respect to the shaft axis, a frictional force is produced in the direction of the shaft axis. This frictional force produces the lateral movement of the roller head for moving the leaf of a sliding door or the like. It is preferred that the shaft is coupled to the drive output of a motor and the roller head is attached securely to the leaf of the door. As the shaft rotates the roller head or heads is/are moved longitudinally along the shaft as a result of the rotation of the shaft and this longitudinal movement is transferred to the leaf of the door.

If one or more oppositely oriented roller heads are provided for each of the two counter running leaves of a sliding door, it is possible to drive these counter running roller heads by means of a single shaft and a single motor.

The present invention provides a very simple drive mechanism for activating sliding doors or the like without the need of expensive transmission facilitites such as threaded spindles with nuts or a cogged wheel and track. The mechanism for converting a rotary driving action into a lateral movement is extremely simple to manufacture and install and requires no matching of gears or cogged parts.

BRIEF DESCRIPTION OF THE DRAWINGS

The present invention will now be explained in greater detail with reference to the following drawings wherein FIG. 1 Is a longitudinal section through a roller head of a drive mechanism according to the present invention.

DETAILED DESCRIPTION

Figure 1:
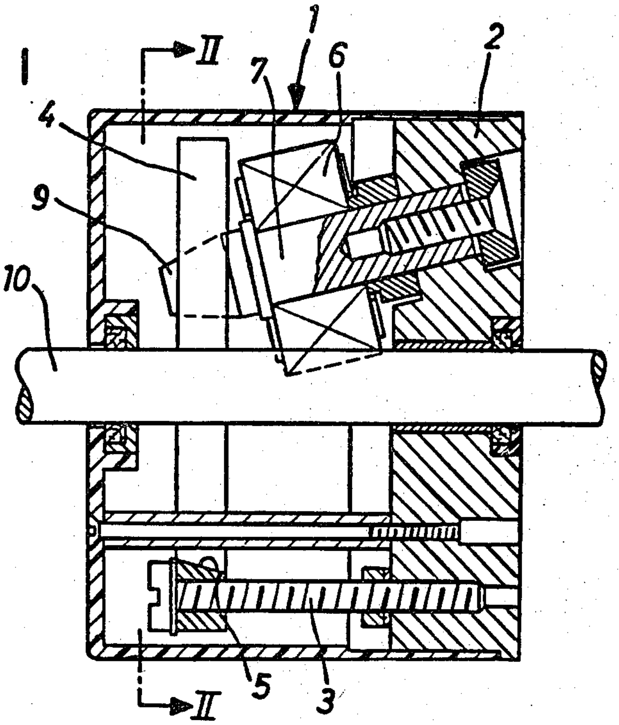
Figure 2:
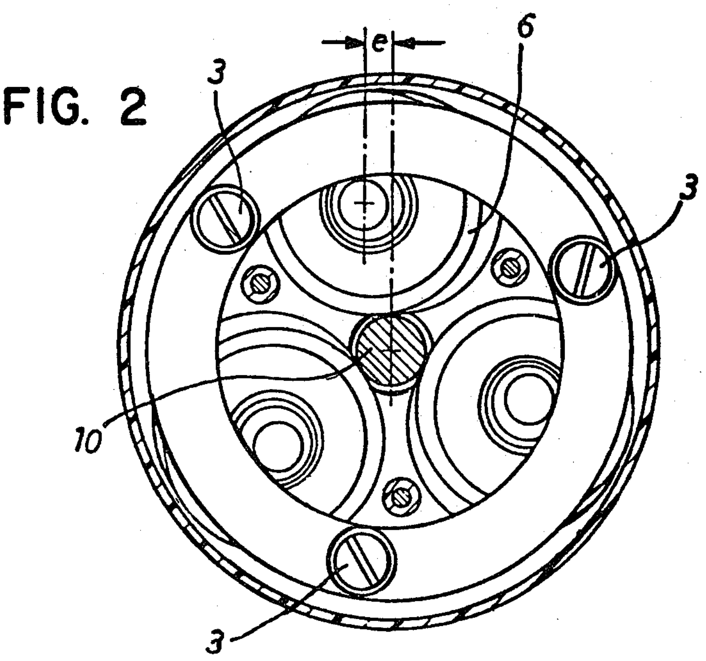
FIG. 2 Is a section along line II—II of FIG. 1.

The roller head shown in FIGS. 1 and 2 comprises a housing 1 having a base 2. A conical ring 4 having an inclined surface 5 is mounted in the housing 1 at a spaced distance from the base 2 by means of screws 3. Mounted on and positioned uniformly around the base 2 are three friction rollers 6 which rotate on bearings 7 which are secured in the base 2. The bearings 7 are approx. as in FIG. 1, inclined to a central shaft 10 which passes through the housing 1 and are displaced a distance e from the axis of shaft 10 as is seen in FIG. 2. The location of bearings 7 is chosen so that a conical end piece 9 at the inner end of the bearings 7 contracts the inclined surface 5 of the conical ring 4 while the outer surface of the roller 6 contacts the circumference of the central shaft 10.

As a result of the foregoing arrangement, an axial force is transferred from the rotating shaft 10 to the stationary bearings 7 via the rotatable rollers 6 which causes the nonrotatable housing 1 on the shaft 10 to be longitudinally displaced parallel to the axis of the shaft 10.

With the roller head shown in FIGS. 1 and 2 the rotational movement of the axially fixed shaft 10 is converted to lateral movement of the housing 1 due to the contact of the inclined rollers 6 on the shaft 10 without the need of expensive gears or cogged parts.

Figure 3:
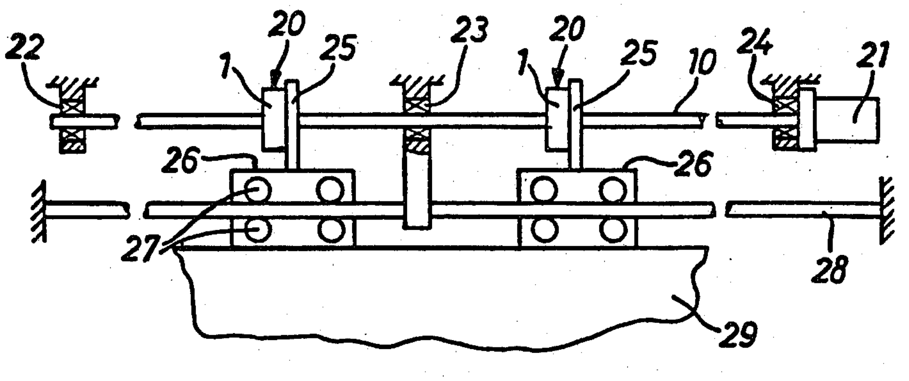
FIG. 3 Is a view of part of a leaf of a sliding door connected to a drive mechanism according to the present invention.

FIG. 3 illustrates schematically a first embodiment in which the principle of the drive mechanism according to the present invention is employed.

Two roller heads of the kind illustrated in FIGS. 1 and 2, indicated by the numeral 20, are mounted on a common shaft 10 on which they can laterally move. The shaft 10 which is supported by three sets of bearings 22, 23, 24, can be rotated by means of an electric motor 21. The housing 1 of each roller head is joined by means of a strut 25 to a sliding part 26 which can be moved along a stationary rail 28 on rollers 27. Both sliding parts 26 are joined permanently to the leaf 29 of a sliding door which is not shown.

As both roller heads 20 are mounted and activated in the same way, they act jointly when motor 21 is put into motion, and move the leaf 29 along the rail 28.

If the leaf 29 can be moved very easily, it may be sufficient if only one roller head 20 is linked to the leaf 29 in the described manner.

Figure 4:
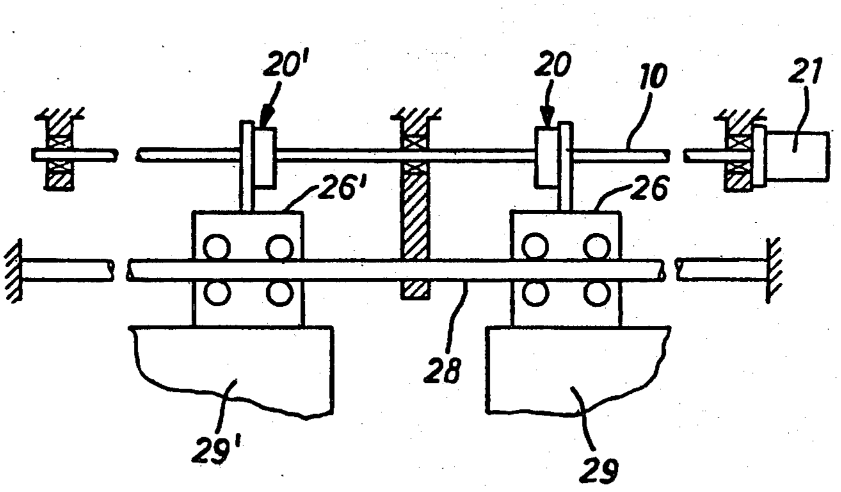
FIG. 4 Is a view similar to FIG. 3 showing the drive mechanism for a sliding door with two leaves running in opposite directions.

In the embodiment shown in FIG. 4, roller heads 20, 20' are linked to leaves 29, 29' respectively. The roller heads 20, 20' are mounted to act in opposite directions i.e. one roller head as shown in FIG. 1 and the other with the opposite inclination to the axis 7 so that on turning the shaft 10 by means of motor 21, the roller heads 20, 20' are displaced in opposite directions. In this way the leaves 29, 29' connected to them via the sliding parts 26, 26' respectively are also moved in opposite directions.

The embodiment shown in FIG. 4 is employed to drive in opposite directions the two leaves 29, 29' of a sliding door by means of only one motor 21, one shaft 10 and one rail 28. Only one additional roller head 20' is required.

What is claimed is:

1. A device for translating rotary movement to lateral movement comprising:

a housing;

a shaft having a first axis of rotation rotatably mounted in said housing;

a bearing ring means for adjustably mounting said bearing ring in said housing coaxial with said shaft and movable longitudinally with respect to said first axis;

a plurality of rollers rotatably mounted in said housing such that said rollers contact said shaft, each of said rollers being mounted on a inclined bearing whose axis intersects said first axis of rotation, each inclined bearing having a first end secured to said housing and a second end contacting said bearing ring whereby said bearing ring is selectively positioned to effectively hold the rollers against the shaft with the desired force; and drive means for rotating said shaft whereby said housing moves laterally along said shaft.

2. A device according to claim 1 wherein said second end of said bearing contacting said bearing ring is provided with a conical surface.

3. A device according to claim 2 wherein said bearing ring is provided with an inclined surface for contacting said conical surface on said second end of said bearing.

4. A device according to claim 1 wherein said housing is secured to the leaf of a sliding door or the like.

* * * * *